United States Patent [19]

Tiepermann

[11] Patent Number: 6,052,404
[45] Date of Patent: Apr. 18, 2000

[54] RADIO COMMUNICATION SYSTEM EMPLOYING A SPREAD-SPECTRUM TECHNIQUE

[75] Inventor: Klaus D. Tiepermann, Nersingen, Germany

[73] Assignee: Rohde & Schwarz GmbH & Co. KG, Munich, Germany

[21] Appl. No.: 09/013,982

[22] Filed: Jan. 27, 1998

[30] Foreign Application Priority Data

Mar. 4, 1997 [DE] Germany ............................ 197 08 626

[51] Int. Cl.[7] .................................................. H04B 1/707
[52] U.S. Cl. ......................... 375/145; 370/209; 370/342; 370/335
[58] Field of Search ..................................... 375/130, 150, 375/142, 145, 200, 208; 370/209, 206, 342, 320, 335

[56] References Cited

U.S. PATENT DOCUMENTS 5,103,459  4/1992  Gilhousen et al. .
5,309,474  5/1994  Gilhousen et al. ...................... 370/209
5,799,010  8/1998  Lomp et al. ............................. 370/335
5,881,056  3/1999  Huang et al. ............................ 370/335

Primary Examiner—Stephen Chin
Assistant Examiner—Lenny Jiang
Attorney, Agent, or Firm—Hill & Simpson

[57] ABSTRACT

In a radio communication system operating according to spread-spectrum techniques, data sequences of a number of communication channels are respectively spread with different orthogonal code sequences and are subsequently multiplied by a pseudo-random noise sequence. The parallel bit streams produced by this multiplication are supplied to a mapping memory in which an allocation rule—defined by the type of modulation being employed—is stored. This mapping memory produces respectively allocated I and Q values into the mapping memory from the bits read synchronously. These I and Q values are read from the mapping memory and are filtered in respective FIR filters and are then supplied to a quadrature modulator as baseband signals. Since the mapping memory emits only two sets of values (the I values and the Q values), only two FIR filters are needed.

5 Claims, 5 Drawing Sheets

| $D_I$ | $D_Q$ | I | Q |
|---|---|---|---|
| 0 | 0 | +1 | +1 |
| 0 | 1 | +1 | -1 |
| 1 | 0 | -1 | +1 |
| 1 | 1 | -1 | -1 |

Fig 4 a

| $D1_I$ | $D1_Q$ | I1 | Q1 |
|---|---|---|---|
| 0 | 0 | +0.2 | +0.2 |
| 0 | 1 | +0.2 | -0.2 |
| 1 | 0 | -0.2 | +0.2 |
| 1 | 1 | -0.2 | -0.2 |

| $D2_I$ | $D2_Q$ | I2 | Q2 |
|---|---|---|---|
| 0 | 0 | +0.5 | +0.5 |
| 0 | 1 | +0.5 | -0.5 |
| 1 | 0 | -0.5 | +0.5 |
| 1 | 1 | -0.5 | -0.5 |

Fig 4b

| MAPPING MEMORY ADDRESSES | | | | VALUE OF I | VALUE OF Q |
|---|---|---|---|---|---|
| $D1_I$ | $D1_Q$ | $D2_I$ | $D2_Q$ | $MAP_I$ | $MAP_Q$ |
| 0 | 0 | 0 | 0 | +0.7 | +0.7 |
| 0 | 1 | 0 | 1 | +0.7 | -0.7 |
| 1 | 0 | 1 | 0 | -0.7 | +0.7 |
| 1 | 1 | 1 | 1 | -0.7 | -0.7 |
| 0 | 0 | 1 | 1 | -0.3 | -0.3 |
| 0 | 1 | 1 | 0 | -0.3 | +0.3 |
| 1 | 0 | 0 | 1 | +0.3 | -0.3 |
| 1 | 1 | 0 | 0 | +0.3 | +0.3 |

Fig4 c

RADIO COMMUNICATION SYSTEM EMPLOYING A SPREAD-SPECTRUM TECHNIQUE

BACKGROUND OF THE INVENTION

The present invention is directed to a radio communication system of the type which operates using spread-spectrum techniques.

Description of the Prior Art

A radio communication system of this type is known (U.S. Pat. No. 5,103,459). The data sequences of each communication channel (sync, paging or voice) are spread with different orthogonal Walsh codes and are subsequently multiplied by an in-phase (I) pseudo-random noise (PN) sequence and by a quadrature phase (Q) PN sequence. The two bit streams resulting therefrom for each channel are filtered through separate FIR (Finite Impulse Response) filters each having the same filter characteristic. A module for setting the channel power (gain) is provided following each of these filters, so that the gain of each communication channel can be separately set. A digital-to-analog conversion then subsequently ensues; the analog output signals of all communication channels being separately added for obtaining an in-phase (I) sum and quadrature phase (Q) sum in two respective summers. The analog I-signals and Q-signals acquired in this way are supplied to a quadrature modulator (IQ modulator) as baseband signals.

Given application of this radio communication system in, for example, mobile radiotelephony, as specified in the TIA Standard IS-95, 64 communication channels are combined to form a CDMA (Code Division Multiple Access) channel. In the known system, this requires a total of 128 FIR filters and 128 gain modules for setting the gain; the circuit outlay is correspondingly high.

SUMMARY OF THE INVENTION

An object of the present invention is to provide a radio communication system of the above type which is simplified with respect to circuit outlay.

The above objects are achieved in accordance with the principles of the present invention in a radio communication system wherein a spread-spectrum technique is employed to spread the data sequences of a number of communication channels respectively with different orthogonal code sequences, the respective spread data sequences being subsequently multiplied by a pseudo-random noise sequence, to obtain a number of base band signals in the form of respective parallel bit streams, the base band signals including I values and Q values. A mapping memory is provided in which an allocation rule is stored, the allocation rule being defined by the type of modulation which is intended to be employed. The base band signals (parallel bit streams) are supplied to the mapping memory, and allocated I values and Q values are read out from the memory, these allocated I values and Q values having been produced according to the aforementioned allocation rule. The allocated I values read from the mapping memory are filtered in one FIR filter, and the allocated Q values read from the mapping memory are filtered in another FIR filter. The outputs of the two FIR filters are supplied to a quadrature modulator.

Only two FIR filters are still required in the inventive radio communication system since the data sequences of the individual communication channels are already combined to form digital I and Q values in a mapping memory before the filtering. The circuit outlay is considerably reduced as a result. It has also proven especially advantageous to also set the gain of the individual communication channels in the mapping memory at the same time by corresponding channel-specific allocation rules, so that the complicated separate gain modules of the above-described known system are not needed. The allocation rule that defines the occupation of the mapping memory also determines the modulation method, for example QPSK modulation, in addition to determining the gains of the communication channels.

In the simplest case—as in the known system—, separate in-phase and quadrature phase pseudo-random noise sequences are generated via two separate pseudo-random noise generators and the data streams, which have previously been spread with different orthogonal code sequences, for example Walsh sequences, are multiplied by the respective PN sequences in an exclusive-OR gate to form two separate I and Q bit streams per communication channel. From these separate bit streams, the I and Q values for the modulator are then determined for all channels in common in the mapping memory according to a modulation-specific allocation rule stored therein. In an embodiment of the invention, this outlay for the editing of the I and Q bit streams per communication channel can also be reduced by multiplying the spread data sequences only with the I or the Q pseudo-random noise sequence in an exclusive-OR operation to form a single bit stream, and the other Q or I pseudo-random noise sequence is compared in an exclusive-OR operation to the pseudo-random noise sequence (I or Q) used for the multiplication. The result of this comparison is subsequently taken appropriately into consideration in the allocation to the respective I Q values emitted as outputs by the mapping memory. Finally, a further reduction of outlay in a version of the inventive system having the same gain for all channels by means of reducing the data streams in number in an additional adder preceding the mapping memory. Different allocations for the setting of the gain of the channels can be stored in separate memory areas in an enlarged mapping memory, so that a switch can be made to a different distribution of the gain of the individual channels on the basis of a simple switchover event.

DESCRIPTION OF THE DRAWINGS

FIG. 4a shows an example of gains employed for operating the radio communication system of the invention.

FIG. 4b shows an allocation between the binary data and the output values, using the gains shown in FIG. 4a, in the radio communication system of the invention.

FIG. 4c shows the content of the mapping memory, based on the allocation shown in FIG. 4b, in a radio communication system according to the invention.

DESCRIPTION OF THE PREFERRED EMBODIMENTS

Figure 1:
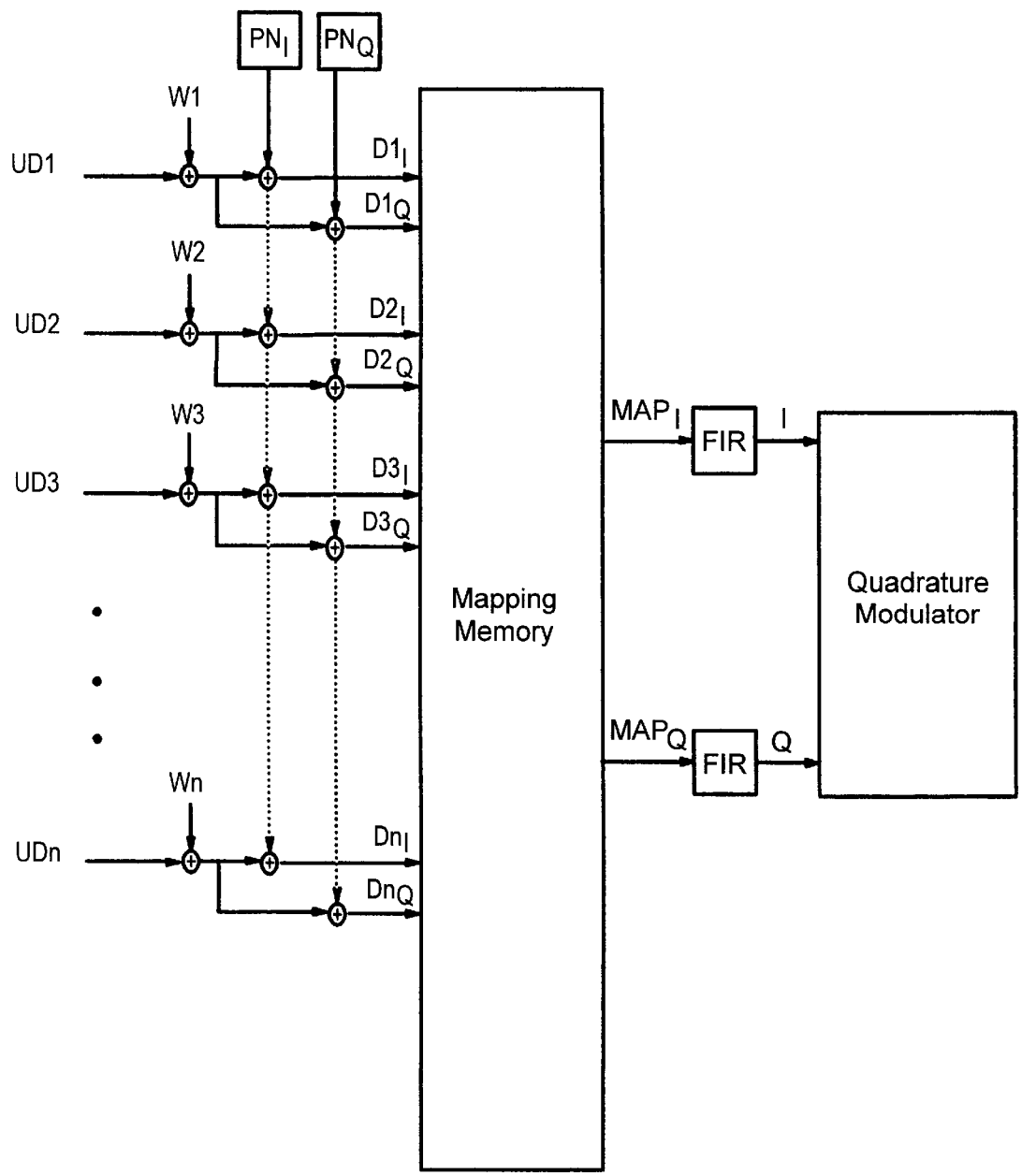
FIG. 1 is a schematic block diagram of a first embodiment of a radio communication system constructed and operating in accordance with the principles of the present invention.

FIG. 1 shows the schematic circuit diagram of an inventive radio communication system wherein the user data sequences UD1 through UDn of a number n of communication channels are respectively spread with different Walsh sequences W1 through Wn of corresponding Walsh generators. Subsequently, these data streams are multiplied at exclusive-OR gates with two pseudo-random noise generators $PN_I$ and $PN_Q$ to form two bit streams $D1_I$, $D1_Q$ through $Dn_I$, $Dn_Q$. These bit streams are supplied in parallel to the address input of a mapping memory. The parallel bit streams are applied to the address input in a sequence synchronized by a clock and are thus converted into allocated I and Q values via the allocation rule that is stored in the memory, and which corresponds to the respective type of modulation being employed. The I and Q values are filtered via separate FIR filters and are supplied as baseband signals to a quadrature modulator.

Figure 5A:
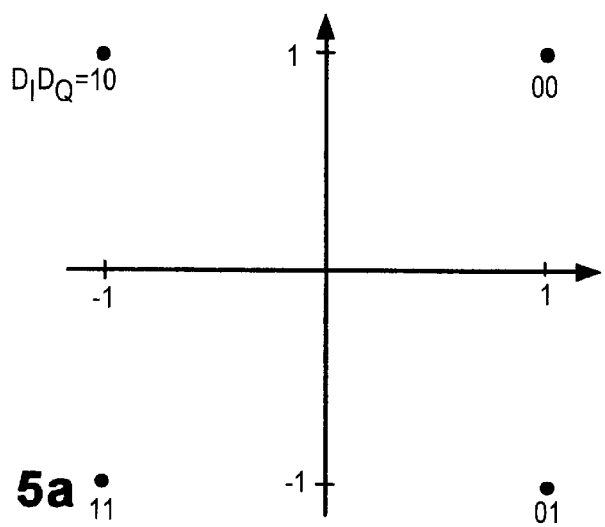
FIGS. 5a, 5b and 5c are graphical representations of the lists respectively shown in FIGS. 4a, 4b, and 4c.
Figure 5B:
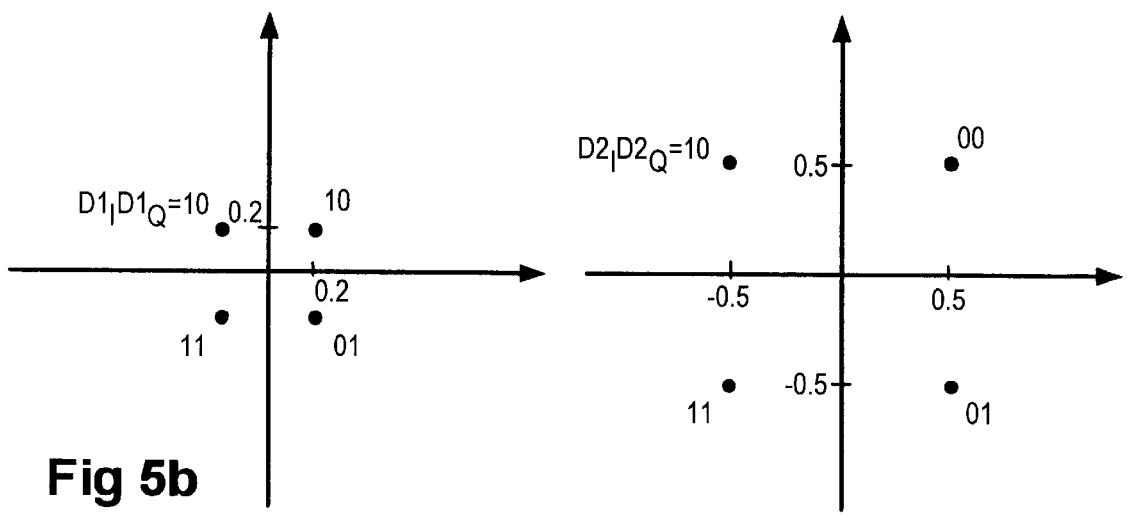
Figure 5C:
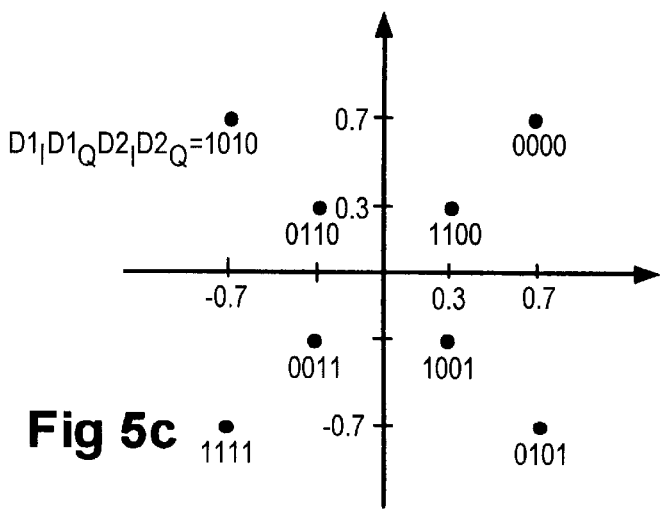

Respective weightings of the gains of the individual channels preferably simultaneously ensues in the mapping memory, as shown in the tables of FIGS. 4a, 4b and 4c and the diagrams of FIGS. 5a, 5b and 5c for two communication channels, for example UD1 and UD2.

For example, a gain of 0.2 is assumed for the first channel and a gain of 0.5 is assumed for the second channel. Further, a QPSK modulation is assumed with the allocation between the binary data $D_I$ and $D_Q$ and the output values I and Q according to FIG. 4a. The allocation patterns according to FIG. 4b arise for the two channels after weighting the channels with the assumed gains. After summation, the following overall allocation pattern and, thus, the content of the mapping memory according to FIG. 4c arises for two channels. When, for example, the address $D1_I=1/D1_Q=0/D2_I=0/D2_q=1$ is applied to the mapping memory with a clock, the value +0.3 for I ($MAP_I$) and the value −0.3 for Q ($MAP_Q$) arises at the output. When the address changes to $D1_I=0/D1_Q=0/D2_I=0/D2_Q=0$ with the next clock, the value +0.7 for I and the value +0.7 for Q occur at the output.

Figure 2:
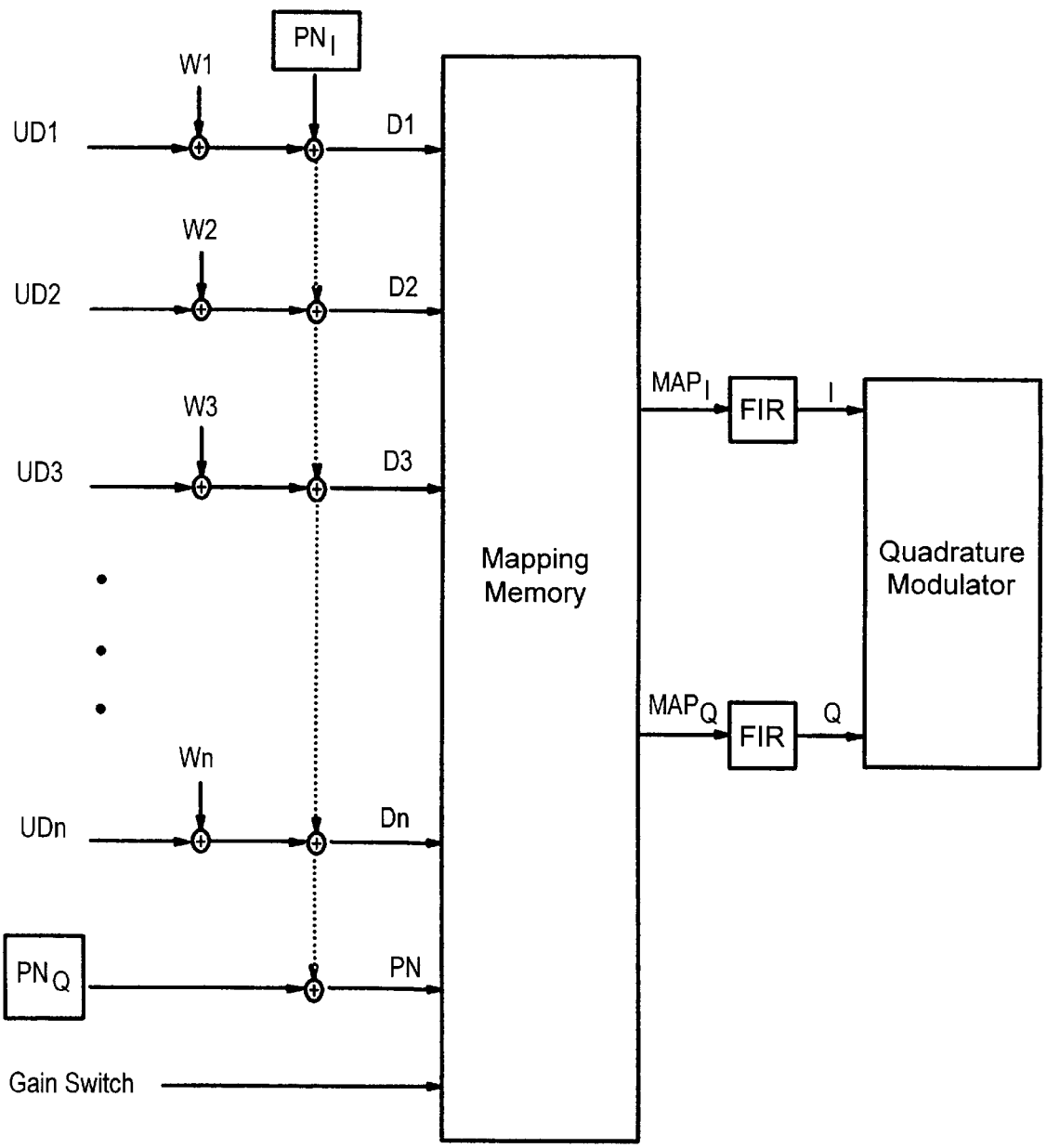
FIG. 2 is a schematic block diagram of a second embodiment of a radio communication system constructed and operating in accordance with the principles of the present invention.

Given the system according to FIG. 2, a multiplication of the user data sequences UD1 ensues only with the I pseudo-random noise sequence $PN_I$, i.e. only the in-phase bit streams $D1_I$ through $Dn_I$ are generated. In an exclusive-OR operation, the quadrature phase pseudo-noise sequence $PN_Q$ is compared to the in-phase pseudo-noise sequence $PN_I$, and a determination is made as to whether $PN_I$ and $PN_Q$ are the same or different. Depending on the result of this comparison, the corresponding generation of the $D1_Q$ or $Dn_Q$ bit stream from which the actual IQ values at the output of the mapping memory are generated then ensues in the mapping memory.

A different setting for the gain of the channels can be stored in an expanded address area of the mapping memory. A control unit can switch via the gain switch to a modified gain setting.

Figure 3:
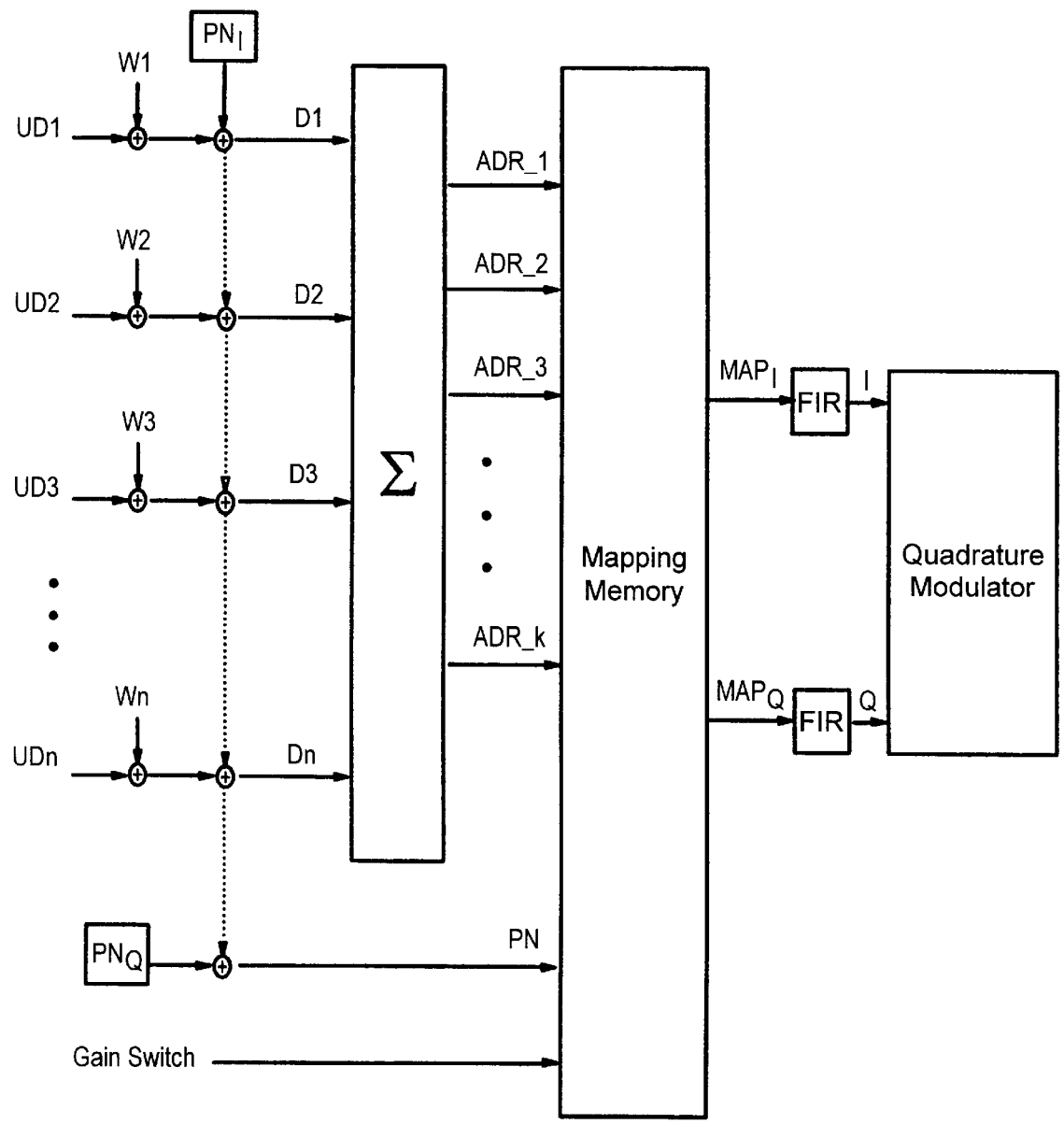
FIG. 3 is a schematic block diagram of a third embodiment of a radio communication system constructed and operating in accordance with the principles of the present invention.

FIG. 3 shows a further possibility of outlay reduction wherein in the individual channels each have the same gain. To that end, a further adder is arranged preceding the actual mapping memory, the n bit streams D1 through Dn being summed therein, so that only k (<n) data streams ultimately remain, which are then supplied to the mapping memory and converted into IQ values, as described above.

Although various minor modifications might be suggested by those skilled in the art, it should be understood that I wish to embody within the scope of the patent warranted hereon all such modifications as reasonably and properly come with the scope of my contribution to the art.

I claim as my invention:

1. A radio communication system comprising:

a plurality of communication channels;

means for employing a spread-spectrum technique for spreading data sequences among said communication channels with different orthogonal code sequences, to obtain spread sequences;

means for multiplying the data sequence in each communication channel by a pseudo-random noise sequence and thereby obtaining a plurality of I value bit streams and a plurality of Q value bit streams;

a mapping memory having a plurality of inputs, to which said plurality of I value bit streams and said plurality of Q value bit streams are respectively supplied in parallel, and having first and second outputs, and comprising means for storing an allocation rule, defined by a type of modulation employed in said communication channels, for respectively allocating said inputs to said first and second outputs, for producing a single I value bit stream at said first output and a single Q value bit stream at said second output;

a first FIR filter, supplied with said single I value bit stream, for producing a first FIR filter output;

a second FIR filter, supplied with said single Q value bit stream, for producing a second FIR filter output; and a quadrature modulator supplied with said first and second FIR filter outputs as base band signals.

2. A radio communication system as claimed in claim 1 wherein said mapping memory further comprises means for storing a further allocation rule for setting gains in said mapping memory for the respective communication channels.

3. A radio communication system as claimed in claim 1 wherein said means for multiplying the spread sequences in each communication channel by a pseudo-random noise sequence comprises means for multiplying said spread sequences only by one of an in-phase pseudo-random noise sequence or a quadrature phase pseudo-random noise sequence to obtain a product, and said radio communication system further comprising means for comparing said product to the pseudo-random noise sequence employed for producing the product to identify the product as containing I values or Q values.

4. A system as claimed in claim 1 wherein each of said communication channels has a gain, with all gains being equal, and wherein said radio communication system further comprises an adder connected between said means for multiplying and said inputs of said mapping memory for adding respective combinations of said bit streams and thereby reducing said bit streams in number.

5. A radio communication system as claimed in claim 1 wherein said mapping memory comprises means for storing a plurality of different allocation rules for providing respectively different gains for said communication channels, and means for selecting one of said allocation rules.

* * * * *